(12) United States Patent
Arnaud et al.

(10) Patent No.: US 9,556,356 B2
(45) Date of Patent: Jan. 31, 2017

(54) GLASS FIBER STRUCTURE DESIGNED TO REINFORCE BONDED ABRASIVE ARTICLES

(71) Applicant: SAINT-GOBAIN ADFORS, Chambery (FR)

(72) Inventors: Alix Arnaud, Montrouge (FR); Philippe Espiard, Gouvieux (FR); Claire Ceugniet, Saint Ours (FR)

(73) Assignee: SAINT-GOBAIN ADFORS, Chambery (FR)

( * ) Notice: Subject to any disclaimer, the term of this patent is extended or adjusted under 35 U.S.C. 154(b) by 344 days.

(21) Appl. No.: 13/939,271

(22) Filed: Jul. 11, 2013

(65) Prior Publication Data

US 2013/0338288 A1    Dec. 19, 2013

Related U.S. Application Data

(62) Division of application No. 12/665,142, filed as application No. PCT/FR2008/051088 on Jun. 18, 2008, now Pat. No. 8,545,584.

(30) Foreign Application Priority Data

Jun. 18, 2007 (FR) ..................... 07 55818

(51) Int. Cl.
| | |
|---|---|
| *C09K 3/14* | (2006.01) |
| *C09D 161/06* | (2006.01) |
| *B24D 3/34* | (2006.01) |
| *C08L 61/06* | (2006.01) |
| *C08L 23/06* | (2006.01) |
| *C08L 91/06* | (2006.01) |

(52) U.S. Cl.
CPC ............. *C09D 161/06* (2013.01); *B24D 3/34* (2013.01); *C08L 61/06* (2013.01); *C08L 23/06* (2013.01); *C08L 91/06* (2013.01); *C08L 2205/02* (2013.01); *Y10T 428/2967* (2015.01)

(58) Field of Classification Search
None
See application file for complete search history.

(56) References Cited

U.S. PATENT DOCUMENTS

| | | | |
|---|---|---|---|
| 3,218,370 A | 11/1965 | Fry et al. | |
| 3,475,513 A | 10/1969 | Benson et al. | |
| 3,663,507 A | 5/1972 | Vogel et al. | |
| 4,338,357 A | 7/1982 | Pichler et al. | |
| 4,680,076 A | 7/1987 | Bard | |
| 4,788,236 A | 11/1988 | Kopf | |
| 4,876,324 A | 10/1989 | Nakano et al. | |
| 5,141,974 A | 8/1992 | Konishi et al. | |
| 5,641,997 A | 6/1997 | Ohta et al. | |
| 6,114,489 A * | 9/2000 | Vicari et al. | ............. 528/84 |
| 7,268,192 B2 * | 9/2007 | Asakage et al. | ............. 525/523 |
| 2003/0124932 A1 | 7/2003 | Droux | |
| 2005/0084788 A1 | 4/2005 | Yau et al. | |
| 2006/0005580 A1 | 1/2006 | Espiard et al. | |
| 2006/0029811 A1 * | 2/2006 | Sugioka et al. | ............. 428/413 |
| 2006/0058473 A1 | 3/2006 | Kawada et al. | |
| 2007/0077425 A1 | 4/2007 | Espiard et al. | |
| 2007/0238831 A1 * | 10/2007 | Klei et al. | ............. 525/55 |
| 2007/0272781 A1 * | 11/2007 | Tsuda et al. | ............. 242/155 R |
| 2009/0170983 A1 * | 7/2009 | Tada et al. | ............. 524/95 |

FOREIGN PATENT DOCUMENTS

| | | |
|---|---|---|
| DE | 227 920 | 10/1985 |
| DE | 43 21 938 | 1/1995 |
| GB | 1 151 174 | 5/1969 |

OTHER PUBLICATIONS

Lin-Gibson, S. "Controlled molecular weight cresol-formaldehyde oligomers" Polymer 43 (2002) pp. 2017-2029.

* cited by examiner

*Primary Examiner* — Kaj K Olsen
*Assistant Examiner* — Ross J Christie
(74) *Attorney, Agent, or Firm* — Oblon, McClelland, Maier & Neustadt, L.L.P.

(57) ABSTRACT

The invention relates to a structure based on glass fiber coated with a resin composition designed to reinforce bonded abrasive articles, the resin composition including the following constituents in the proportions indicated, expressed in percentage by weight of solid matter:
  75 to 98% of a mixture of at least one novolac having a glass transition temperature lower than or equal to 60° C. and at least one novolac having a glass transition temperature above 60° C.,
  0.5 to 10% of at least one wax,
  0 to 3.5% of at least one plasticizing agent.

13 Claims, No Drawings

GLASS FIBER STRUCTURE DESIGNED TO REINFORCE BONDED ABRASIVE ARTICLES

This application is a Divisional application of U.S. application Ser. No. 12/665,142 filed Feb. 23, 2010, the entire content of which is incorporated herein by reference, and now U.S. Pat. No. 8,545,584, which is a 371 of International Application No. PCT/FR08/51088, filed on Jun. 18, 2008, which claims priority of French Application No. 0755818, filed on Jun. 18, 2007.

The present invention relates to the field of abrasives. It relates more precisely to a structure based on glass fiber coated with a resin composition designed to reinforce bonded abrasive articles, in particular grinding wheels, the resin composition used for coating this structure and the bonded abrasive articles incorporating such a structure.

Abrasive articles contain a multitude of abrasive particles solidly bound together by a binder. These articles are widely employed for machining parts made of various materials, particularly in cut-off, deburring, surface grinding and polishing operations.

In a conventional manner, the following may be distinguished:
- coated abrasives that comprise a flexible backing on the surface of which abrasive particles are distributed fixed in a binder. The flexible backing may be a sheet of paper or a network of fibers, for example, a mat, a felt or a fabric. These articles may adopt various forms, sheets, disks, belts, cones, etc.
- bonded abrasives that are obtained from a mixture of abrasive particles and a binder, formed and compacted by molding under pressure. They consist essentially of abrasive grinding wheels.

Bonded abrasive articles to which the invention more particularly relates are abrasive grinding wheels for cutting of hard materials, in particular steel. These grinding wheels are employed on machines operating at a high peripheral speed, and on account of this must be able to withstand high mechanical stresses produced by the latter.

In particular, it is important for the following requirements to be satisfied:
- the abrasive particles must be suited to the nature of the material to be processed: they must be sufficiently durable so as not to crumble in contact with said material, and to preserve sufficiently sharp edges so that they can cut it;
- the binder must have good tensile strength so that the abrasive particles remain bonded to it and are not torn out under the effect of centrifugal force. In addition the binder should be able to withstand high temperatures that result from high friction with the material to be processed; the binder must neither flow nor be degraded under the effect of heat,
- the abrasive grinding wheel should not wear prematurely nor burst; it must retain its initial dimensional properties for as long as possible so that cutting is carried out under good conditions.

It is usual to consolidate the abrasive grinding wheel by incorporating therein at least one structure based on reinforcing yarns, particularly glass fiber yarns that may be for example in the form of a fabric.

However, given that bare glass fiber has virtually no adhesion to the binder, it is necessary to coat the structure of the glass fiber with a resin composition that ensures a bond between the glass and the binder.

In a known manner, the reinforcing structure is obtained by passing the glass fiber through a bath with a resin composition consisting of an alcoholic solution containing of the order of 70% by weight of resin, and then passing it between two rollers so as to remove the excess resin, and finally in a chamber heated to a temperature of the order of 100 to 145° C. for a maximum of a few minutes so as to reduce the quantity of solvent based on the resin to a value of approximately 5% to 10%. The reinforcing structure obtained in this way is collected in the form of a winding, for example a reel, or is cut up either into sheets or directly into the desired shape and dimensions of the final grinding wheel, for example by means of a punch.

In a subsequent step, the abrasive grinding wheel is obtained according to the method that consists of placing in a mold, alternately, several layers of the mixture of abrasive particles and binder on the one hand, and of the reinforcing structure on the other hand, and of molding the assembly by compression either hot or cold. After demolding, the article obtained is treated thermally under temperature conditions enabling the binder to be crosslinked and finally to obtain the abrasive grinding wheel.

The resin compositions most commonly used for the production of the aforementioned reinforcement structures comprise at least one thermosetting resin chosen from:
- urea-aldehyde resins, for example a urea-formaldehyde resin (GB-A-419 812),
- phenolic resins, for example a novolac associated with a cross linking agent hexamethylenediamine, (GB-A-1 151 174) or mixture of a resol in solution and solid novolac associated with a crosslinking agent, hexamethylenetetramine (U.S. Pat. No. 4,338,357), and
- mixtures of urea-aldehyde resins and phenolic resins, for example a urea-formaldehyde prepolymer and a phenolic resin in the A stage (U.S. Pat. No. 4,038,046) or a urea-formaldehyde resin and a resol in the presence of an acid catalyst (U.S. Pat. No. 5,551,961).

The aforementioned resin compositions are not costly and they enable reinforcing structures to be obtained that exhibit good properties, particularly in terms of flexibility and adhesive power.

It is in point of fact important that the structure has a sufficient high flexibility, that is to say the resin is not too "hard" so that the cutting operations as previously described can be carried out under acceptable conditions, by generating the least possible dust and by operating so that the resin is not removed in the vicinity of the cut edges of the structure (glass is not laid bare).

However, it is also necessary for the adhesive power (also called "tack") not to be too high, so as not to soil the cutting tools, to limit contamination during storage by dust that adheres to the structures and to avoid having to place an antiblocking material on the structure before it is reeled up or between cut structures.

As regards the regulations, it is necessary to have non-polluting resin compositions available, that is to say those that contain—but also that generate during application to the reinforcement structure or subsequently—the fewest possible compounds considered as being able to harm human health or the environment.

In this respect, the aforementioned resin compositions do not give complete satisfaction.

Urea-formaldehyde resins are not heat-stable and degrade while liberating formaldehyde as soon as the temperature exceeds 100° C. Formaldehyde may thus be released when the reinforcing structure is produced, during drying in the heated chamber and when the abrasive grinding wheel is used.

Phenolic resins are obtained by the condensation of phenol and formaldehyde, either in a formaldehyde/phenol molar ratio less than 1 in the presence of an acid catalyst (novolacs) or in a formaldehyde-phenol molar ratio greater than 1 in the presence of a basic catalyst (resols). Novolacs contain virtually no free formaldehyde but they are used in conjunction with a crosslinking catalyst such as hexamethylenediamine and hexamethylenetetramine that is not heat-stable and generates emissions of formaldehyde and ammonia during the production of the reinforcing structure and use of the abrasive grinding wheel. Resols contain free formaldehyde in a relatively high quantity.

The object of the present invention is to develop a resin composition capable of coating a glass fiber structure designed to reinforce bonded abrasive articles, and in particular grinding wheels, that gives the structure great flexibility and low adhesive power, and that limits the risk of polluting emission of formaldehyde and nitrogen-containing compounds.

This objective is achieved by virtue of the invention that provides a reinforcing structure coated with a resin composition comprising the following constituents in the proportions indicated, expressed as a percentage by weight of solid matter:

- 75 to 98% of a mixture of a least one novolac having a glass transition temperature lower than or equal to 60° C. and at least one novolac having a glass transition temperature above 60° C.,
- 0.5 to 10% of at least one wax,
- 0 to 3.5% of at least one plasticizing agent.

The combination of novolacs having different glass transition temperatures and wax has proved to be particularly valuable for producing a resin composition capable of coating a glass fiber structure that is suitable for the reinforcement of bonded abrasives. The properties of the novolacs and wax are in point of fact complementary.

The novolac having the lower glass transition temperature gives flexibility to the structure and makes it possible to have a high level of flexibility. It makes it possible to compensate for the too high rigidity of the novolac with a higher glass transition temperature and in this way to adjust the flexibility to the desired level.

As already mentioned, it is important to have high flexibilities so that the structure can be correctly cut, in particular without the resin composition being able to "crumble away" in the region of the edges, leaving the glass bare.

Preferably, the novolac having the lower glass transition temperature, that is to say below or equal to 60° C., represents 50 to 80% by weight of the mixture of novolacs.

Advantageously, the glass transition temperature of the novolac with the lower glass transition temperature is above 40° C. Similarly, the glass transition temperature of the novolac having the higher glass transition temperature is above or equal to 80° C., and advantageously lower than or equal to 100° C.

Novolacs according to the invention may be chosen from novolacs known to a person skilled in the art obtained by reacting a phenolic compound, preferably phenol, and an aldehyde, preferably formaldehyde, in the presence of an acid catalyst (pH of the order of 4 to 7). Preferably, the formaldehyde/phenol molar ratio varies from 0.75 to 0.85. The choice of novolac is made according to the desired glass transition temperature.

Novolacs that may be used within the context of the invention contain less than 0.1% by weight of free formaldehyde, and preferably less than 0.05%.

Wax acts as an "antiblocking" agent and makes it possible to compensate for the high adhesive power of the novolac that has the lower glass transition temperature. As already said, an adhesive power that is not too high makes it possible, on the one hand, to preserve cut reinforcing structures in a very valuable state of cleanliness that avoids contamination by dust, and on the other hand makes it possible to handle these cut structures with a minimum risk of their adhering to each other under moderate pressure, notably during storage.

The wax is chosen from paraffin waxes, for example polyethylene or polypropylene waxes, and ethylenebisamide waxes, notably N,N'-ethylenebis(steramide). Advantageously, the wax is microcrystalline.

Preferably, the wax content does not exceed 5% by weight of solid matter of the resin composition, and advantageously is less than or equal to 3%.

The plasticizing agent contributes to an improvement to the flexibility of the resin composition. As examples of such agents, mention may be made of alkylphosphates, phthalates, triethanolamine, oils and polyhydric alcohols, notably glycerol and glycols.

Preferably, the plasticizing agent content does not exceed 1% by weight of solid matter of the resin composition.

It should be noted that the resin composition coating the reinforcing structure according to the invention does not contain any crosslinking agent, which is particularly advantageous since novolacs may preserve their initial thermoplastic nature. The resin composition is not likely to change with time so that the reinforcing structure may be stored for a very long period, which is a supplementary advantage compared with known resin compositions.

The reinforcing structure may be composed of continuous glass yarns, preferably in the form of a nonwoven such as a web or a mat, a mesh or fabric, or of a mat of cut strands.

The glass yarns are yarns called "reinforcing", produced industrially from molten glass threads flowing from the multiple orifices of a die, these threads being drawn out mechanically in the form of continuous filaments that are assembled into a base yarn and then collected by reeling on a rotating support.

The glass yarns according to the invention are thus base yarns, and products derived from these yarns, in particular assemblies of these base yarns in laminates. Such assemblies are obtained by simultaneously unreeling several coils of base yarns and then assembling them into meshes that are reeled onto a rotating support. The glass yarns may undergo a twisting operation in order to produce textile yarns for producing fabrics.

The glass yarns consist of glass filaments of which the diameter may vary widely, for example from 9 to 24 μm, preferably 9 to 17 μm. Advantageously, the glass yarns have a count (or linear mass) of between 34 and 4800 tex, preferably between 34 and 1200 tex.

The yarns may consist of any type of glass, in particular E, C and AR (alkali-resistant). Preferably, they consist of E glass.

According to a preferred embodiment, the structure is a fabric composed of glass yarns, having a grammage that varies from 100 to 1000 g/m$^2$.

The resins composition itself, before it is applied to the reinforcing structure, also constitutes an object of the invention. Thus, the resin composition comprises the following compounds, expressed in percentage by weight:

25 to 55% of at least one novolac having a glass transition temperature less than or equal to 60° C.,
10 to 30% of at least one novolac having a glass transition temperature above 60° C.,
0.5 to 6.5% of at least one wax,
0 to 2.5% of at least one plasticizing agent,
25 to 45% of at least one alcohol,
0 to 15% of water.

As an alcohol according to the invention, mention may be made of methanol, ethanol, isopropanol and mixtures of these alcohols.

The resin composition may be prepared by simply mixing the constituents in a suitable vessel, advantageously provided with stirring means. The novolacs are preferably in the form of a solution in ethanol or a mixture of ethanol and methanol, the wax is a dispersion in water and the plasticizing agent is liquid.

As the case may be, the resin composition may contain additives such as emulsifiers, pigments, fillers, antimigration agents, coalescing agents, wetting agents, biocides, organosilanes, antifoam agents, colorants and anti-oxidant agents. The additives content does not exceed 3% of solid matter of the resin composition.

Production of the coated reinforcing structure is carried out continuously by passing it first of all through an impregnating bath consisting of the liquid resin composition, and then through the nip of a calendering device composed of two rollers, which makes it possible to adjust the resin composition content to a value close to 30% by weight of solid matter, and finally through a heated chamber so as to remove part of the solvent. Preferably, the chamber comprises a first zone heated to a temperature of the order of 130° C. and at least one second zone heated to a temperature of the order of 110° C., the dwell time of the reinforcing structure in both zones being generally less than ten minutes, preferably varying from 30 seconds to 3 minutes. Preferably, the percentage solvent in the reinforcing structure is less than 12% and advantageously less than 10%. The reinforcing structure obtained is then collected in the form of a reel and cut up either into sheets or directly in the shape and dimensions of the final abrasive grinding wheel, these cut structures being then stored in the form of stacks.

The reinforcing structure according to the invention may be used in particular for producing bonded abrasive articles such as abrasive grinding wheels, these articles thus constituting an object of the invention.

These abrasive articles may be produced in particular according to compression molding techniques known to a person skilled in the art. For example, the abrasive grinding wheels may be obtained by depositing several alternate layers of a granular mixture of abrasive particles inside a mold, and the reinforcing structure previously cut up to the dimensions of the mold. The number of reinforcing structures varies according to the desired level of the performance for the abrasive grinding wheel; generally, this number does not exceed 10.

The mold is put under pressure sufficient to form a "green" part that exhibits cohesion so that it may be handled and processed in the following steps without substantial modification to the shape and dimensions. The mold may be heated during compression (hot molding) to a temperature that is generally below 170° C. or even 150° C. The binder at this stage is in the non-crosslinked state.

The green part is removed from the mold and heated in an oven at a temperature enabling the binder to crosslink and to give a hardened polymer network that gives the part its final form. Crosslinking is carried out according to a conventional curing cycle that consists of bringing the green part to a temperature of the order of 100° C. and of holding it at this temperature for 30 minutes to several hours so that the volatile products formed may be removed. The part is then heated to a temperature of the order of 200 to 250° C. for 10 to 35 hours.

The abrasive grinding wheel obtained in this way may be used in all types of application that require abrasive properties, for example sanding, deburring, surface finishing operations, and more particularly the cutting of hard materials, such as steel.

The examples given hereinafter enable the invention to be illustrated without however limiting it.

In these examples, the properties of the resin composition and the reinforcing structure were evaluated under the following conditions:

Resin
the glass transition temperature (Tg) was measured by DMTA (Dynamic Mechanical Thermal Analysis).
the number average molar weight ($M_n$) and the weight average molar weight ($M_w$) were determined by gel permeation chromatography (GPC) under the following conditions:
stationary phase: Styragel® HR4E marketed by Waters, held at 30° C.
mobile phase: tetrahydrofuran (THF)
detection: differential refractometry (ΔRI)
calibration: polystyrene standards Resin Composition
the flexibility of the resin composition was measured as follows: the resin composition (weight content in solid matter: 40 to 60%) was deposited on a piece of paper (dimensions: 20 mm×70 mm; grammage: 3600 g/m²) and a 200 μm thick layer was spread out with the aid of a film spreader. The paper was dried in a heated chamber at 140° C. for 1 minute. A free end of the paper was fixed to a horizontal support and a weight of 2.8 g was suspended from the other end. After 4 minutes, the angle θ that the paper made to the horizontal was measured. The flexibility was suitable when the value of the angle θ was above or equal to 30°.

adhesive power was evaluated as follows: two cylindrical aluminum studs were used with a circular cross section (area: 3.2 cm²). 0.2 ml of the resin composition was deposited on each section and the studs were placed in a ventilated chamber heated to 130° C. for 10 minutes. After cooling for 30 minutes at ambient temperature, the studs were stored in a controlled atmosphere (temperature: 22° C.; relative humidity 50%) for a variable period. The surfaces coated with the resin composition were placed in contact with each other while applying a pressure of 50 N for one minute. The assembly was placed on a tensile machine and the force necessary to separate the studs was measured. The adhesive power was satisfactory when the force was less than 30 N.

Reinforcing structure
amount of dust: a sample of the reinforcing structure was weighed and folded manually along a length of 44 to 46 cm. The sample was unfolded and weighed. The percentage of loss in weight of sample corresponded to the amount of dust. The amount of dust is a parameter that makes it possible to evaluate the ability to be cut: it is considered as being acceptable when its value is less than 2%.

adhesive power: two reinforcing structures in the form of a 10 to 12 cm diameter disk were superimposed and a temperature of 50 N was applied for one minute. The sample was placed on a tensile machine and the force necessary to separate the structures was measured. The adhesive power was satisfactory when the force was less than 5 N.

the tensile strength of the warp or weft was measured under the conditions of ISO standard 3341 applicable to glass yarn up to 2000 tex. The value of the textile strength had to be greater than 300 N.

the loss on ignition was measured under the conditions of ISO standard 1887.

EXAMPLE 1

A resin composition was prepared comprising the following constituents:

|  | (% by weight) | (% solid matter) |
|---|---|---|
| Novolac[1] (Tg around 40° C.) | 50.0 | 76.47 |
| Novolac[2] (Tg around 80° C.) | 13.0 | 20.58 |
| Polyethylene wax [3] | 2.0 | 2.95 |
| Water | 3.0 |  |
| Alcohol | 32.0 |  |

The resin composition had the following properties:
flexibility: 35°
adhesive power: 0 N at t=0
0.13 N at t+15 days
2.37 at t+30 days

EXAMPLE 2

A resin composition was prepared comprising the following constituents:

|  | (% by weight) | (% solid matter) |
|---|---|---|
| Novolac[1] (Tg around 40° C.) | 47.0 | 74.28 |
| Novolac[2] (Tg around 80° C.) | 13.0 | 20.00 |
| Polyethylene wax [3] | 3.5 | 5.72 |
| Water | 5.5 |  |
| Alcohol | 31.0 |  |

The resin composition had the following properties:
flexibility: 35°
adhesive power: 0.80 N at t=0
1.20 N at t+15 days
1.35 at t+30 days

COMPARATIVE EXAMPLE 1

A resin composition was prepared under the conditions of example 1, modified in that it only contained the novolac[1]:

|  | (% by weight) | (% solid matter) |
|---|---|---|
| Novolac[1] (Tg around 40° C.) | 65.0 | 100 |
| Alcohol | 35.0 |  |

The resin composition had the following properties:
flexibility: >30°
adhesive power: 88.44 N at t=0

COMPARATIVE EXAMPLE 2

A resin composition was prepared under the conditions of example 1, modified in that it comprised the following constituents:

|  | (% by weight) | (% solid matter) |
|---|---|---|
| Novolac[1] (Tg around 40° C.) | 59.0 | 94.20 |
| Polyethylene wax [3] | 3.5 | 5.80 |
| Water | 5.5 |  |
| Alcohol | 32.0 |  |

The resin composition had the following properties:
flexibility: >30°
adhesive power: 26.95 N at t=0

COMPARATIVE EXAMPLE 3

A resin composition was prepared under the conditions of example 1, modified in that it comprised the following constituents:

|  | (% by weight) | (% solid matter) |
|---|---|---|
| Novolac[1] (Tg around 40° C.) | 52.0 | 78.80 |
| Novolac[2] (Tg around 80° C.) | 14.0 | 21.20 |
| Alcohol | 34.0 |  |

The resin composition had the following properties:
flexibility: 35°
adhesive power: 34.40 N at t=0

EXAMPLE 3

This example illustrates the application of the resin composition in a semi-industrial installation.

A glass fiber fabric (grammage): 198 g/m$^2$; warp thread: EC 204 tex s/z; weft thread RO 408 tex), 0.5 m wide, unwound from a reel, was disposed on a coating line operating continuously. On its path, the fabric passed into an impregnating bath containing the resin composition and was then treated in an oven comprising a first section heated to 125° C., and a second section heated to 115° C., before being collected in the form of a reel.

The resin composition comprised the following constituents:

|  | (% by weight) | (% solid matter) |
|---|---|---|
| Novolac[1] (Tg around 40° C.) | 50.0 | 77.15 |
| Novolac[2] (Tg around 80° C.) | 14.0 | 20.77 |
| Polyethylene wax [3] | 1.3 | 2.08 |
| Water | 1.7 |  |
| Alcohol | 33.0 |  |

[1]Phenol-formaldehyde novolac: $M_n$ = 829; $M_w$ = 2176; ethanol solution at 65% by weight solid matter.
[2]Phenol-formaldehyde novolac: $M_n$ = 1247; $M_w$ = 5779; solution with 70% by weight solid matter in a 25:5 ethanol:methanol mixture.
[3] Marketed under the reference "Hydrocer 69" by Shamrock.

The reinforcing fabric had the following properties:
Amount of dust: 0.03%
Adhesive power: 0 N
Tensile strength (warp thread): 304 N
Tensile strength (weft thread): 343 N
Loss on ignition: 30%
Volatile compounds content: 4.65%

The invention claimed is:
1. A resin composition, comprising the following, expressed in percentage by weight
25 to 55% of at least one first novolac having a glass transition temperature lower than or equal to 60° C.,

10 to 30% of at least one second novolac having a glass transition temperature above 60° C.,
0.5 to 6.5% of at least one wax,
0 to 2.5% of at least one plasticizing agent,
25 to 45% of at least one alcohol,
0 to 15% of water,
wherein the resin composition does not comprise a cross-linking agent.

2. The resin composition of claim 1, wherein the alcohol is methanol, ethanol, isopropanol, or a mixture thereof.

3. The resin composition of claim 1, wherein the first novolac has a glass transition temperature above 40° C.

4. The resin composition of claim 1, wherein the second novolac has a glass transition temperature above or equal to 80° C.

5. The resin composition of claim 1, wherein the second novolac has a glass transition temperature below or equal to 100° C.

6. The resin composition of claim 1, wherein the first novolac and the second novolac are obtained by a process comprising reacting phenol and formaldehyde in a formaldehyde/phenol molar ratio that varies from 0.75 to 0.85.

7. The resin composition of claim 1, wherein the wax is at least one paraffin wax, at least one ethylenebisamide wax or a mixture thereof.

8. The resin composition of claim 1, wherein the wax content does not exceed 5% by weight of solid matter of the resin composition.

9. The resin composition of claim 1, wherein the wax content does not exceed 3% by weight of solid matter of the resin composition.

10. The resin composition of claim 1, wherein the plasticizing agent is alkylphosphate, phthalate, triethanolamine, oil, polyhydric alcohol or a mixture thereof.

11. The resin composition of claim 1, wherein the plasticizing agent content does not exceed 1% by weight of solid matter of the resin composition.

12. The resin composition of claim 1, wherein the wax is a paraffin wax, wherein the paraffin wax is polyethylene or polypropylene.

13. The resin composition of claim 1, wherein the wax is an ethylenebisamide wax, wherein the ethylenebisamide wax is N,N'-ethylenebis (steramide).

* * * * *